June 1, 1937.   W. TALLMADGE   2,082,471
MOTOR CONTROLLED VALVE
Filed July 26, 1934   4 Sheets-Sheet 2
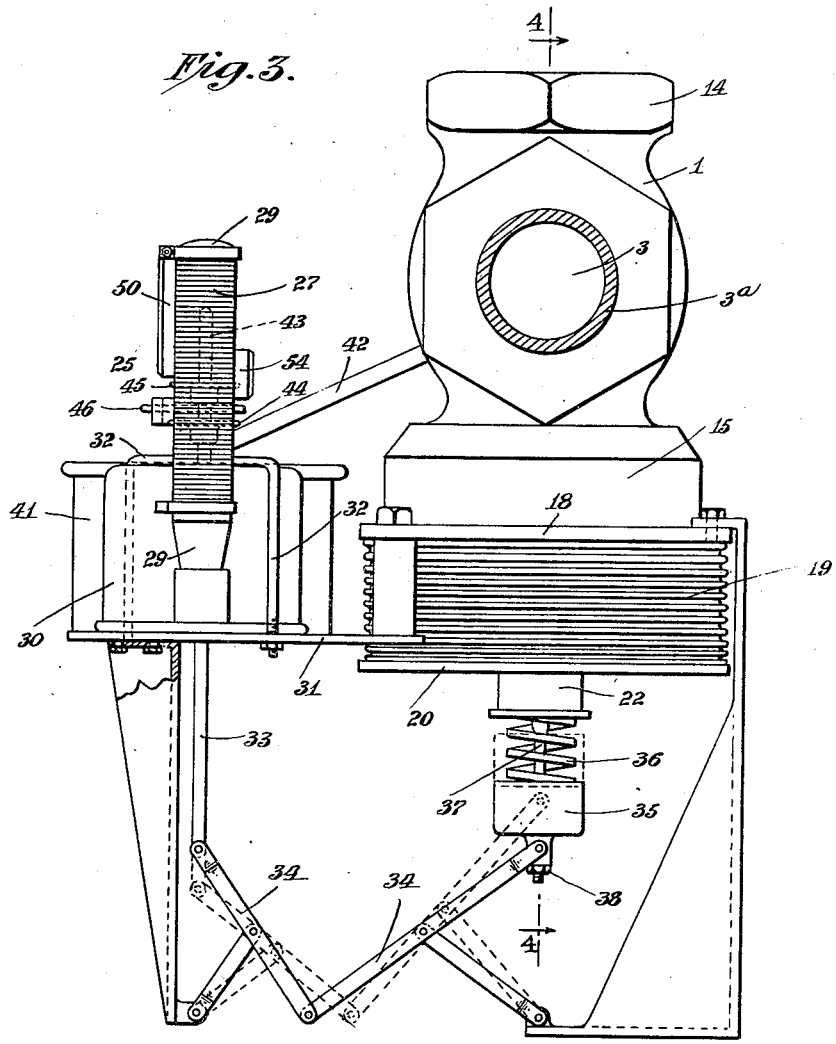

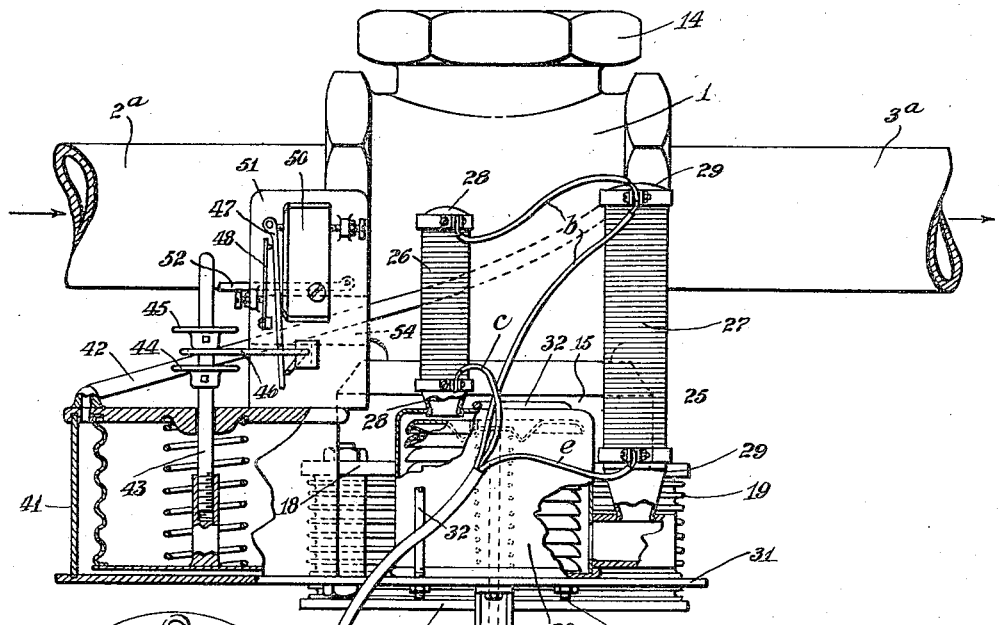

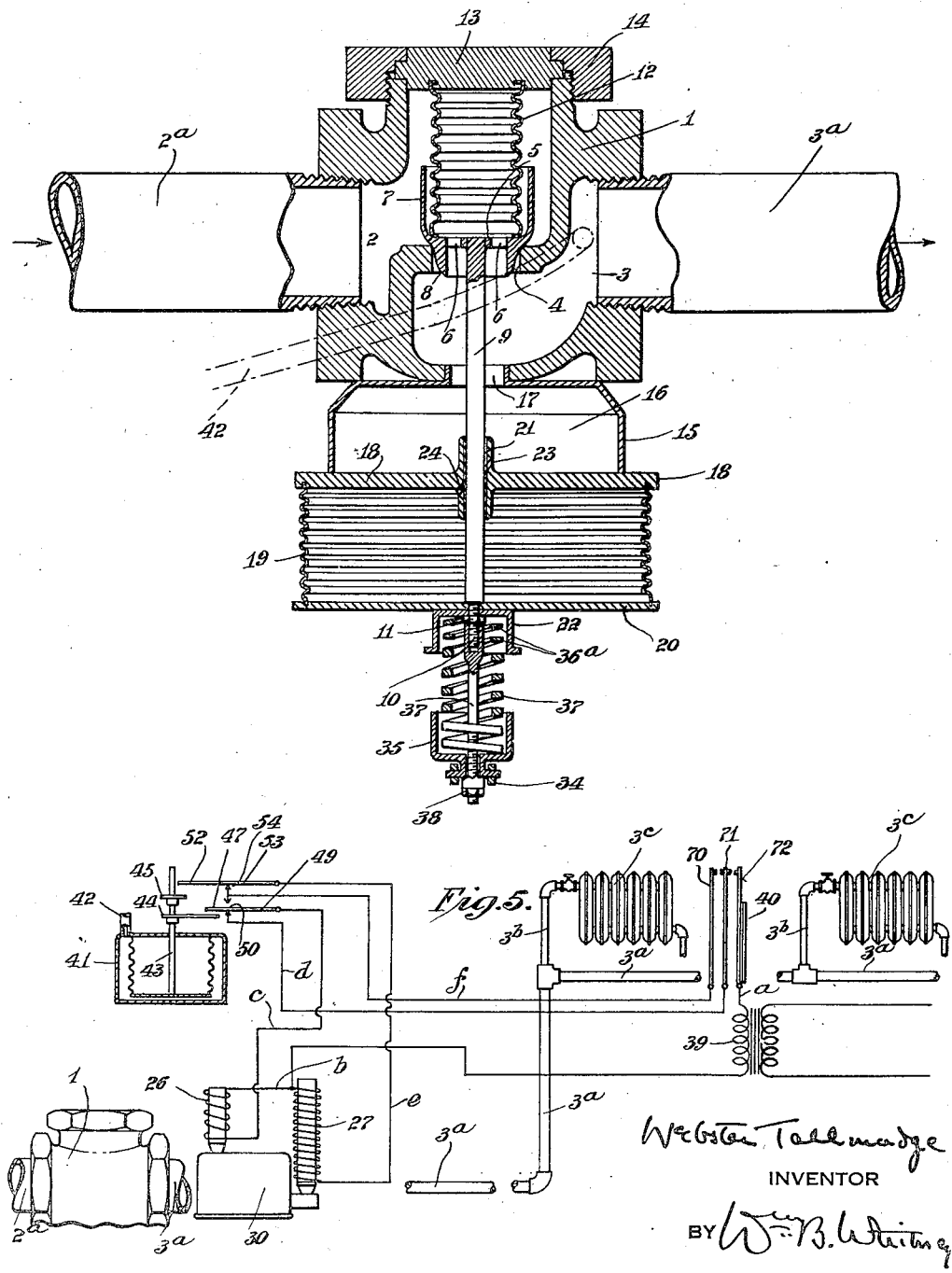

June 1, 1937.  W. TALLMADGE  2,082,471
MOTOR CONTROLLED VALVE
Filed July 26, 1934  4 Sheets—Sheet 4
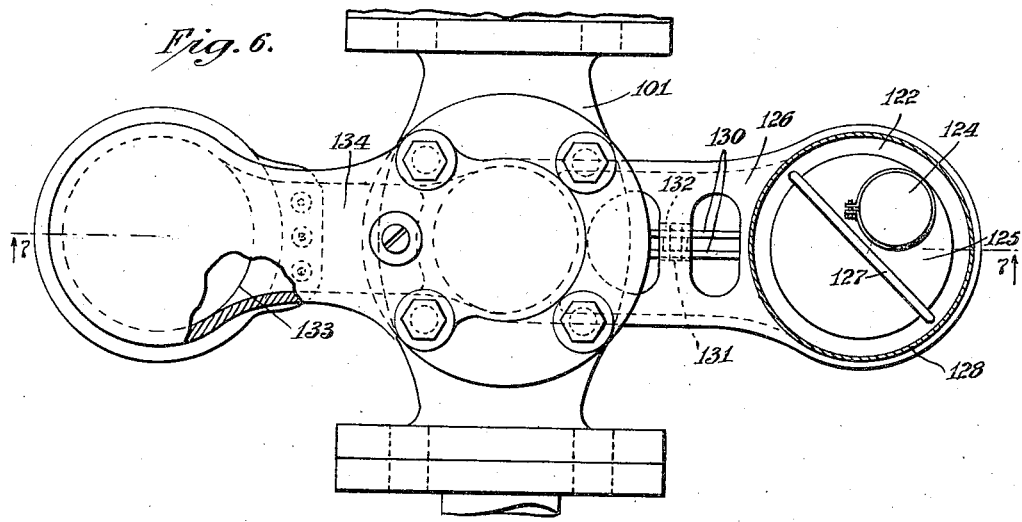
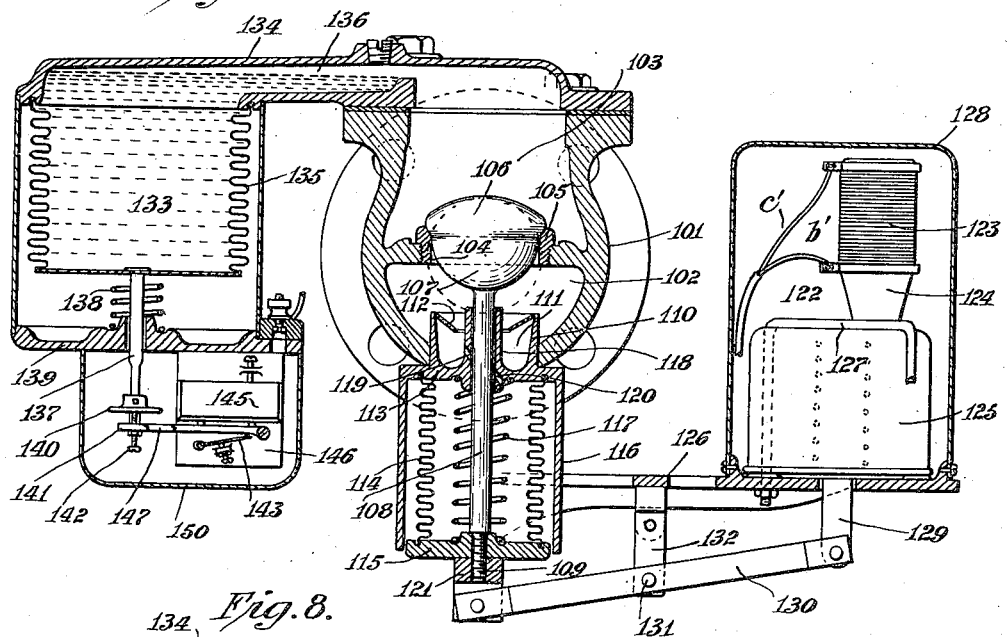
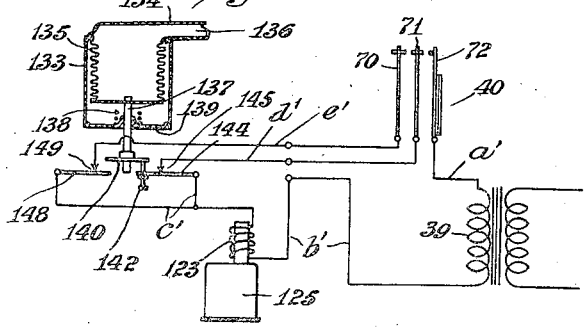
Webster Tallmadge
INVENTOR
BY Geo. B. Whitney
ATTORNEY Patented June 1, 1937

2,082,471

UNITED STATES PATENT OFFICE 2,082,471

MOTOR CONTROLLED VALVE

Webster Tallmadge, Montclair, N. J., assignor to Webster Tallmadge & Company, Inc., New York, N. Y., a corporation of New York Application July 26, 1934, Serial No. 737,004

7 Claims. (Cl. 236—92)

This invention relates to a fluid circulating system—specifically, a one- or two-pipe system for circulating and distributing a fluid heating medium like steam or hot water and with special reference to the heating of small and medium sized buildings of the residential type; and the object thereof is to provide a delicately balanced and smoothly operating automatic valve, of the nature of a reducing valve, which while capable of use in many different connections is primarily designed and peculiarly adapted for use in the pipe, or in one or more of the branch pipes of a zoned system, supplying the heating medium at low pressures either from the boiler of a furnace or from a street main to the radiators, where, under thermostatic, manual or other remote control, it will if desired so regulate the supply of the heating medium as to effect a flow thereof to the several radiators, equipped in a two-pipe system with inlet orifices either of a variable area or of a fixed area metering type and in a one-pipe system with suitable air valves, at one of two or more accurately defined rates—for example, one at a predetermined maximum flow rate and a second at some predetermined fraction of such maximum flow rate—when and as required to maintain the room temperatures approximately at the predetermined desired degree.

The invention will be understood by reference to the accompanying illustrative drawings, in which—

Figure 1 is a view, in side elevation and partly in section, of a valve embodying my improvements in one practical and what I now consider to be the preferred form thereof; Fig. 2 is a plan view of the same; Fig. 3 is a view of the valve in end elevation; Fig. 4 is a sectional view thereof on the line 4—4 of Figs. 2 and 3; Fig. 5 is a diagrammatic view of the valve connected up to supply a heating medium to a two-pipe heating system and of the electric circuits controlling the actuating motor under the dual control, as shown, of the pressure-responsive device associated therewith and a thermostat; Fig. 6 is a plan view, with parts in section, of a modified form of the valve; Fig. 7 is a view of the modified valve in longitudinal vertical section; and Fig. 8 is a diagrammatic view of the electric circuits controlling the motor actuating this modified valve, also, as shown, under the control of the pressure-responsive device associated therewith and a thermostat.

Referring first to Figs. 1-5 of the drawings, the body 1 of the valve provides the usual inlet and outlet passages 2 and 3, shown as threaded at their outer ends to receive the threaded ends of the usual inlet and outlet pipes 2ª and 3ª (the latter connected, see Fig. 5, by branch distributing pipes 3ᵇ to the valve inlet orifices of a plurality of radiators 3ᶜ), and a connecting seat opening 4; and the valve disk 5 operatively associated with the seat opening is of special design, being provided with a plurality of openings 6, 6 and having both an upwardly projecting cylindrical skirt 7 and an annulus 8 of reduced size and with tapering outer walls projecting downwardly therefrom within the seat opening, and is fixed to the upper end of the spindle 9 which at its lower end terminates in a shoulder surrounding a reduced threaded extension 10, for a nut 11. Within the inlet passage of the valve there is mounted a spring bellows member 12, of a mean diameter equal to the diameter of the seat opening 4, which at its lower end extends down within the protecting skirt 7 and is brazed or otherwise tightly secured to the top of the valve disk 5 and, for convenience of assembly, is fixed at its upper end within an annular groove in the under side of a closure disk 13 removably secured in place upon the annular shoulder surrounding the usual upper opening in the valve body by a ring nut 14. And below the valve body and suitably secured thereto there is the casing 15 of a chamber 16 which communicates with the outlet passage of the valve through the opening 17 and within which the steam on the low pressure side of the valve may condense; and beneath this chamber there is a bellows, of greater capacity than the bellows above, formed by the spring bellows member 19, which is fixed at its upper end in the under side of the bottom wall 18 of the casing 15 and at its lower end in a movable header plate 20. The valve spindle 9 extends downwardly through the opening 17 and thence through the bore of the central hub-like portion 21 of the wall 18 and its reduced threaded end 10, passed through an axial opening provided therefor in the header plate 20 and a similar opening in the bottom of an inverted cup 22, receives the nut 11 by which the cup is secured to the plate and the plate in turn is secured to the shoulder of the spindle. The bore through the hub 21 is of slightly larger diameter than the diameter of the spindle and so provides a clearance, say 1/64 of an inch, so restricted as to afford retarded communication between the chamber above and the interior of the bellows below, and is further connected therewith by two inclined holes 23 and 24 drilled through the walls of the hub, the former opening into the chamber somewhat above its bottom so as to be clear of any film of dirt which may settle thereon and the latter opening into the interior of the bellows at, or slightly breaking, the under side of the wall 18 so as not to entrap any air in the fluid collecting therein.

Constructed as shown and described, the effective flow area through the seat opening provided by the lifting of the valve disk varies directly as the square of the outer diameter of that portion of the depending annulus then operatively within this opening, and the curved profile outline of the disk and annulus may be so shaped and proportioned as to accurately give any desired ratio of flow area to valve lift. For the use here intended such profile outline is shown as so designed that, with a certain prescribed gauge steam pressure in pounds per square inch on its high pressure side, the full lift of the valve will open up an accurately defined flow area sufficient to supply the exact amount of steam required when discharging into a low pressure, of three pounds for example, to effect and maintain a flow thereof through the inlet orifices of the radiators at a maximum or 100 per cent. flow rate and that on, say, a one-third lift of the valve the flow area thereby provided will supply the steam required to effect and maintain under a greatly reduced pressure a flow thereof through the inlet orifices of the radiators at a flow rate 20 per cent. of the maximum. The small upper bellows serves to balance the valve by enclosing and so removing from pressure on the high pressure side of the valve the upper surface of the valve disk throughout an area substantially equal to the area of the seat opening and by providing equal pressure areas below and (through the openings 6 to the interior of the bellows) above the valve disk on the low pressure side, while the larger bellows below, in connection with the chamber and restricted passage around the spindle, not only acts as a dash-pot or gag to prevent the pulsating and chattering of the valve but also obviates the necessity for the stuffing box usually required, thereby eliminating the friction, wear, leakage, and packing replacement incidental to such a device.

For the operation of the valve I have here provided a vapor-pressure motor 25, of standard or any suitable type, having two heating elements or coils 26 and 27, one a small and the other a relatively large coil, thermally associated with corresponding upright chambers 28 and 29 which contain a volatile liquid and communicating with the pressure chamber 30 equipped with the usual spring bellows. This motor is conveniently mounted, opposite the valve, upon a shelf plate 31 to which it is secured, by a U-bolt 32 as shown, and which in turn is secured by bolts to the projecting side of the casing wall 18; and the stem 33 of its bellows is operatively connected with the valve spindle 9 by a pantograph linkage 34 which connects it to a hollow boss on the bottom of the cup 35 and thence by the spring 36 which is seated at its lower end in the cup 35 and its upper end in the inverted cup 22. Several of the end coils 36ᵃ of this spring are, preferably, of reduced section and hence render it weaker at such end and through the remainder of its length to render it more sensitive to the lower pressures. The cup 35 is guided in its upward and downward movements by a spindle extension 37 which at its upper end is screwed upon the reduced upper end 10 of the spindle, outside the nut thereon, and at its threaded lower end passes through the hollow boss on the bottom of the cup 25 and receives a lock-nut 38, which nut serves as a stop to limit the downward movement of the cup and thereby the expansion of the spring, when released by the motor, and to pull the valve tight down upon its seat. The pantograph linkage between the stem 30 of the motor and the cup 35, reciprocating on the spindle extension 37, prevents any such springing of these parts as would cause binding.

The heating coils in the motor are supplied with electric current from a suitable source, such as the secondary winding 39 for the transformer (see Fig. 5), by circuit connections which may be, and in the embodiment of the invention here illustrated are, controlled jointly by what may be designated as a dual-control thermostat 40 (shown only in Fig. 5) having three spring-contact fingers 72, 71 and 70 and by a pressure-responsive device 41, also of the spring bellows type and with or without a supplementary spring, which is mounted on an end of the shelf plate 31, is operatively connected by the pipe 42 with the outlet chamber 3 and hence is responsive to a pressure of 3 pounds, for example, on the low pressure side of the valve, and carries on the stem 43 of its bellows the two adjustably mounted members 44 and 45. The lower member 44 is operatively associated, by the bent crank ends of a rock member 46, with the lever 47 which actuates, against the adjustable pressure of a light spring 48, the movable member 49 (shown only in Fig. 5) of a double-throw switch 50, of standard make and with its contacts enclosed in an insulating box, mounted vertically on the front face of the upright plate 51 fixed to the top of the pressure device 41. The upper member 45 is operatively associated directly with the lever 52 which actuates the movable member 53 (shown only in Fig. 5) of a single-throw switch 54, also of standard make and with contacts enclosed in an insulating box, mounted horizontally on the rear face of the plate 51. The circuit connections of these various parts with a source of electrical supply 39 are provided, as shown in Fig. 5, by the wires $a$, $b$, $c$, $d$, $e$ and $f$.

The operation of the valve in controlling the supply of steam, for example, to the radiators of a house heating system, as illustrated in Fig 5, is as follows:

Assume that the thermostat has been thrown onto its daytime setting, as by the usual thermosat clock, for a mean room temperature of 72°, for example. So long as the temperature remains above say 71° the contacts of the thermostat will be open, breaking thereat the circuits through both heating coils of the motor, the valve will be closed, and there will be no steam flowing to the radiators. If, however, the temperature at the thermostat falls, say to 71°, the contact-finger 72 will be bent to the left and close contact with contact-finger 71, thereby establishing a circuit from the transformer winding 39 by wire $b$ through the small heating coil 26 and thence by wire $c$, lower closed contacts of switch 50, wire $d$, contact-fingers 71 and 72, and wire $a$ back to the other side of the winding 39; whereupon the motor, in response to the heat generated in the coil 26, will operate to so raise the cup 35 and compress the spring 36, chiefly at the end having the weaker coils, that it will effect against the retarding influence of the dash-pot bellows above a slow and smooth opening of the valve to the extent of approximately one-third of its total lift, thereby permitting a flow of steam through the valve in the quantity and under the low pressure required to produce a flow of steam to the radiators at a flow rate equal to substantially 20 per cent. of the maximum. In case the steam thus admitted to the radiators is sufficient under the then existing conditions the temperature at the thermostat will rise, opening the contact between the contact-fingers 72 and 71 and breaking the circuit through the heating coil 26, thus allowing the valve to close and shut off the steam. On the other hand, if the steam thus admitted to the radiators is insufficient, or becomes insufficient by a change in conditions, and the temperature at the thermostat falls say another degree, to 70°, the contact-finger 72 will be bent further to the left and press contact-finger 71 into contact with contact-finger 70, thereby establishing a circuit from the transformer winding 39 by wire b through the large heating coil 27 of the motor and thence by wire e, closed lower contact of switch 54, wire f, contact-fingers 70, 71 and 72, and wire a back to the other side of the winding. Both coils of the motor are now in circuit and by the combined heat generated in the two coils the motor is operated to further raise and compress the spring 37 to the extent necessary to effect a lifting of the valve to its wide open position, thereby admitting a supply of steam sufficient to build up the pressure required and give a 100 per cent. flow rate of steam through the inlet orifices of the radiators. This condition will remain effective until the steam so supplied to the radiators causes a rise of temperature at the thermostat. As the temperature rises above 70° contact-finger 71 will be released and spring away from contact-finger 70, opening thereat the circuit through the large heating coil 27, and so allowing the valve to drop say two-thirds of the way back to closed position where it will be retained by the action of the small heating coil 26 until, on a further rise of temperature to above 71°, contact-finger 72 of the thermostat opens its contact with contact-finger 71 and breaks the circuit of this heating coil and so, by cutting out the motor entirely, allows the valve to close. The motor will continue to be operated in accordance with the changes which occur from time to time in the temperature at the thermostat, all of the movements of the valve effected thereby, both opening and closing movements, taking place slowly and smoothly under the retarding influence of the dash-pot bellows.

When the thermostat is shifted from its day-time to night-time setting, the motor will be operated when and as required to maintain a mean temperature of 50°, for example.

This valve is, as has been stated, so designed that on full lift it will pass sufficient steam to produce under a pressure of say about three pounds a maximum or 100 per cent. flow rate through the inlet orifices to the radiators; and the pressure-device 41 is so designed that it will remain inoperative so long as the pressure on the low pressure side of the valve does not exceed three pounds. In case this pressure for any reason exceeds such value it will cause the stem 43 to rise until the member 44 thereon engages and raises the outer bent end of the rock-member 46 and so causes its inner bent end to swing the lever 47 outwardly, in a clock-wise direction, to thereby open the lower normally closed contacts of the switch 50 and break thereat the circuit of the small heating coil 26. A continued rise of the pressure on the low pressure side of the valve will cause the stem 43 to rise further, and thereupon the member 44 will throw the lever 47 further out to the left, thereby re-establishing a circuit through the small heating coil 26 through the upper contacts of the switch 50 and wire f, while at the same time the member 45 will engage and lift the lever 51 of switch 54 and so open the normally closed contacts of that switch, thus breaking thereat the circuit through the large heating coil 27. On a fall back to the selected low pressure on the low pressure side of the valve the contacts of these switches will be restored, in reverse order, to their normal condition.

Thus, as will be apparent, there will at all times be such interaction of the thermostat and the pressure-responsive device as will effect first a closure and then an opening of the contacts in the circuits of the motor, through its small heating coil under mild weather conditions and through both heating coils under severe weather conditions, when and as required to effect and maintain a valve opening which will give the proper pressure to the radiator inlet orifices both for uniform proportional partial heating of the radiators when the thermostat calls for mild heating and for uniform full heating of the radiators when the thermostat calls therefor, while under all conditions precluding too high a pressure and consequent over supply of steam to those radiators remaining turned on when some of them are turned off. Otherwise, as radiators were turned off, the steam being supplied to them would be forced into and overheat the remaining radiators, giving an unbalanced heating or too much heat in mild weather.

In the modified form of the valve illustrated in Figs. 6–8 of the drawings, the body 101 has the usual inlet and outlet passages 102 and 103 connected by the seat opening 104, here shown with a detachable seat 105. The valve disk 106, with an integral bulbous extension 107 projecting downwardly therefrom through the seat, is solid and is stream-lined throughout. The spindle 108 is fixed at its upper end to the bulbous extension of the disk and at its lower end terminates in a shoulder surrounding the threaded extension 109. The annular wall 110 of a chamber 111 is set into and fixed within an opening in the lower wall of the valve body, the chamber being in communication with the inlet passage 102 of the valve through a central opening provided by an inturned and downwardly inclined lip 112 around the upper edge of the casing wall; and beneath this chamber there is, as in the valve first described, a bellows which is formed by the spring bellows member 114 fixed at its upper edge in the lower side of the bottom casing wall 113 and at its lower edge in the movable header plate 115 and which is enclosed and protected by a skirt 116 depending from the extended edges of the bottom casing wall. This bellows is provided, as here shown, with a supplemental spring 117. Here also the lower casing wall has a central hub-like portion 118 through the bore of which the spindle 108 passes with a clearance of the character and for the purpose already described in connection with the first form of the valve, and as before the bore of the hub is further connected with the chamber above and the interior of the bellows below by similar inclined holes 119 and 120. The reduced threaded extension at the lower end of the valve spindle passes through an axial opening provided therefor in the header plate 115 and receives a nut 121 by which the plate is secured to the shoulder of the spindle.

The effective flow area through the annular passage opened up by the lifting of the valve disk varies in the way hereinabove described, and the curved profile outline of the disk and its bulbous extensions may, similarly, be so shaped and proportioned as to accurately give any desired ratio of flow area to valve lift. Here, however, the single bellows performs the function of the two with which the first form of valve is equipped, serving both to substantially balance the valve by providing equal areas of upward and downward pressures on the valve disk—upward against its lower face and downward through the chamber and the interior of the bellows on the header-plate 115—and as a dash-pot to dampen the valve and to obviate the necessity for a stuffing box.

This valve is operated by a vapor-tension motor 122 which has a single heating coil 123 thermally associated with an upright chamber 124 communicating with the usual pressure chamber 125. The motor is mounted opposite the valve upon the shelf-plate 126, which is cast integral with or otherwise supported on the skirt 116, and is secured thereto, as before, by a U-bolt 127 and protected by a cover 128. The stem 129 of the motor is operatively connected with the valve spindle by the rock-bar 130 which is pivoted at one end to the end of the stem and at the other end upon the flattened outer end of the nut 121 and rocks upon a central pivot 131 on the lower end of a swinging member 132 pivotally mounted at its upper end on the shelf-plate 126.

The pressure-responsive device 133, which with a dual-control thermostat 40 jointly controls the circuits of the heating coil of the motor, is here supported by a casting 134 which is bolted to the flange surrounding and closes an opening in the upper part of the valve body, forms the upper head of the spring bellows member 135, and connects the interior of the bellows chamber with the outlet passage 103 of the valve through the channel 136 provided therefor in the casting. The stem 137, surrounded by spring 138, which normally does not contact with the lower movable head of the bellows, passes through an orifice provided therefor in the head 139 of a cover enclosing the bellows and carries an adjustably mounted member 140. This member 140 is operatively associated with the lever 141, through an adjustable threaded post 142 set in the end of the lever, which against the adjustable pressure of the light spring 143 actuates the movable member 144 (shown only in Fig. 8) of a single-throw switch 145, with enclosed contacts similar to the switch 50 hereinabove described, mounted on one side of a plate 146 depending from the cover-head 139 and is also operatively and directly associated with the lever 147 which actuates the movable contact 148 of a second single-throw switch 149 (shown only in Fig. 8) like the switch 145 and similarly mounted on the other side of the plate 146, the parts all being enclosed by a protecting cover 150.

The operation of the modified form of the valve as used to control the supply of steam to a house heating system is much the same as of that already described. With the thermostat at its daytime setting, a fall of the temperature thereat to 71°, for example, will cause contact-finger 72 to close contact with contact-fingers 71, establishing a circuit from the transformer winding 29 by wire b' to the heating coil 123 of the motor and thence by wire c', closed contacts of switch 144, wire d', contact-fingers 71 and 72 and wire a' back to the other side of the transformer winding. The motor will thereupon operate to raise the spindle and lift the valve disk from its seat, permitting a flow of steam through the valve and thence through the inlet orifices to the radiators. If the steam thus admitted to the radiators is sufficient to raise the temperature above 71° the contact-finger 72 will spring to the right breaking thereat the circuit through the heating coil and stopping the motor, effecting a closure of the valve and cutting off the steam. On the other hand, should the temperature further fall, to 70° for example, contact-finger 72 will press contact-finger 71 against contact-finger 70 to close a second circuit through the heating coil 123 from the transformer winding by the wire b as before and thence by wire c' closed contacts of switch 148 and wire e', contact-fingers 70, 71 and 72 and wire a' back to the transformer winding. On a rise of temperature, the contacts of the thermostat will open and the circuits of the heating coil will be broken in reverse order. Such control by the thermostat of the circuits of the heating coil of the motor however, will be modified by the action of the pressure-responsive device 133. This device is, or may be, so adjusted that it will remain in the position shown, leaving the contacts of the switches 145 and 149 closed, so long as the pressure of steam in the outlet passage of the valve does not exceed that produced on the lifting of the valve disk to allow a flow of steam which will give the moderate flow rate through the inlet orifices of the radiators, as selectively determined by the thermostat, of say 20 per cent. of the maximum; but on a slightly greater pressure will respond, open the contacts of switch 145, and break the circuit of the heating coil of the motor which on cooling permits the valve to close slightly until on the drop in pressure the contacts of the switch again close, re-establishing the circuit through the heating coil of the motor and thereby effecting a lift of the valve sufficient to restore the pressure. This cycle of alternate opening and closing of the contacts controlled by the pressure-responsive device holds the motor and valve in a given position within the very close limits determined by the variations of pressure. In the arrangement shown, the spring effect of the metallic bellows member 135 is used to retard the pressure for moderate heating. When the thermostat calls for full heat the pressure so increases that the spring 138 is compressed, and the contacts of the full heat switch 149 are adjusted for a pressure that will maintain a full steam flow through the radiator inlet orifices to give full heat. Thus, as for a moderate heat, the alternate opening and closing of the contacts of switch 149 on slight variations in the pressure holds the open position of the valve and the consequent pressure within close limits for full heat flow whenever and so long as called for by the thermostat, preventing oversupply of steam to the radiators and making the use of return traps unnecessary. The method of pressure regulation here provided also keeps those radiators which remain in service free from overheating when some of the radiators are turned off.

The operative principle of the valve, in whatever form it may be embodied for practical use, may be briefly summarized as follows: The operation of the valve motor which controls the position of the valve disk and thereby the flow area through the valve is controlled jointly by the thermostat and the pressure device. The thermostat selectively determines, according to its adjustment and setting, the position of the valve disk and the flow area for no flow, moderate flow, and full flow of steam to the radiators. And the pressure device, responding to variations in pressure effected by changes in the position of the valve disk, but slowly and with small movements since a slight shift in the position of the valve disk will quickly change the pressure, is almost constantly actuated to alternately open and close the switch contacts controlled by it and thereby effect corresponding opening and closing movements of the valve disk, with the result that the average flow area and pressure will be held closely to the flow area and pressure which will satisfy the heating requirements as called for by the thermostat.

The great advantage of the invention is that it provides a relatively inexpensive and wholly dependable means for so regulating the admission of the heating medium to the distributing pipes of a heating system as to promptly effect and closely maintain a pressure therein which will effect a uniform flow of the heating medium to the radiators in the several rooms of a house or heating zone, under the control of the thermostat located in one of the rooms and regardless both of the location of the radiators and of variations from time to time in the number in use, whether at a full or at some proper moderate flow rate as selectively determined by the thermostat according to the prevailing weather conditions, with the accompanying economy in fuel and increase in the comfort and health of the occupants; whereas, in the more expensive heating system equipped with the usual on and off thermostatic control, there is always a lag in response to the thermostat—sometimes called "fly-wheel" effect—causing short periods of alternate overheating and overcooling, which will be the more pronounced the farther away the radiator is located, and overheating and overcooling effects will also be produced in those in use by the turning off and on of some of the radiators.

While I have shown and described my improved automatic valve as adapted for use in a steam-heating system and as operated by a vapor-pressure motor, it is to be understood that it may be used in heating, or cooling, systems employing for the purpose any suitable fluid medium and that an electromagnetic motor, gravity motor, air, oil or water motor, or motor power of other suitable type may be substituted for the vapor-pressure motor. In case the valve is actuated by a screw-threaded spindle, the motor to be used therewith will of course be one adapted to effect a rotary instead of a reciprocating movement of the spindle.

It is also to be understood that, while the valve motor has been shown and described as jointly controlled in its operation by a thermostat and a pressure-responsive device, either or both thereof may be omitted and the motor controlled, if desired, by any other suitable means. Moreover, the temperature and pressures mentioned, in degrees Fahrenheit and in gauge pressures respectively, are merely illustrative and may be varied as desired, and the pressure-responsive device, when used, need not be associated with the valve but may be operatively connected with the distributing system at any suitable point, preferably at or near the center thereof.

The parts of the valve can be reversed so that the disk will lift against the high pressure within the inlet passage and the resulting unbalance overcome by the use of the larger or more powerful motor, or its mechanism can also be further modified, in its various structural details, within the scope of the appended claims, without departing from the spirit or sacrificing the substantial advantages of the invention.

What I claim as new, and desire to secure by Letters Patent, is—

1. The combination of a valve, a vapor-tension motor with two heating coils controlling the valve, and jointly controlling the motor a device responsive to temperature operative to selectively close an electric circuit either through one or through both heating coils, to thereby effect either a partial or a substantially full lift of the valve, and a device responsive to pressure on the low pressure side of the valve operative to hold substantially uniform the pressure due to the lift of the valve as selectively determined by the thermostat.

2. The combination of a spindle actuated and bellows balanced valve, a vapor-pressure motor operatively connected with and controlling the valve through a dampening device, and electric circuits for the motor jointly controlled by plural sets of thermostat contacts and by plural sets of contacts controlled by a pressure-responsive device.

3. A motor controlled valve of the type described comprising a body with inlet and outlet passages and valve seat with opening connecting said passages, a spindle actuated valve disk operatively associated with the valve seat, and means including a spring bellows operatively associated with the spindle of the valve disk and responsive to pressure in the inlet passage of the valve providing substantially equal areas of upward and downward fluid pressures on the valve disk and serving also as a dash-pot to dampen the movements of the valve disk.

4. A motor controlled valve comprising a body with inlet and outlet passages and valve seat with opening connecting said passages, a spring bellows associated with the valve body in communication at its fixed inner end with the passage on one side of the valve seat and closed with a header plate at its movable outer end, a valve disk operatively associated with the valve seat with spindle extending outwardly through the spring bellows in manner to leave only a restricted passage connecting the interior of the bellows with the adjacent passage in the valve body and fixed at its outer end to the movable head of the bellows, an electrically controlled motor operatively connected with the movable outer head of the spring bellows and the spindle of the valve disk, and electric circuits for the motor jointly controlled by plural sets of thermostat contacts, plural sets of contacts controlled by a pressure-responsive device.

5. The combination of a spindle actuated and bellows balanced valve, a vapor-pressure motor operatively connected both with the valve spindle and with the outer movable head of the balancing bellows, electric heating circuits for the motor, and control means for the electric circuits including contacts controlled by a remote control device and contacts controlled by a pressure device connected with the low pressure side of the valve operative only in response to rises of pressure therein above either one of two predetermined values whereby the valve may be so selectively actuated as to provide and maintain substantially uniform a flow of fluid therethrough at either one of two predetermined flow rates.

6. The combination of a valve, a vapor-tension motor with one relatively small and a second larger heating coil controlling the valve and, jointly controlling the motor, a device responsive to temperature operative to selectively close an electric circuit either through the smaller heating coil or through both heating coils to thereby effect either a partial or a substantially full lift of the valve, and a device responsive to pressure on the low pressure side of the valve operative on a rise of the pressure above a predetermined minimum to open normally closed contacts in the circuit of the smaller heating coil, on a further rise of pressure to close other normally open contacts in the circuit of the smaller heating coil, and on a rise of the pressure to a predetermined maximum to open normally closed contacts in the circuit of the larger heating coil.

7. The combination of a valve, a vapor-tension motor with two heating coils controlling the valve, and jointly controlling the motor a device responsive to temperature operative to selectively close contacts either in the circuit of the first or in the circuits of both heating coils, and a pressure device responsive to pressure on the low pressure side of the valve operative at predetermined stages on a rise of such pressure first to open normally closed contacts in the circuit of the first heating coil, then to close other normally open contacts in the circuit of the first heating coil and finally to open normally closed contacts in the second heating coil, and on a fall of such pressure to restore said contacts to normal position in reverse order.

WEBSTER TALLMADGE.